(12) United States Patent
Parry et al.

(10) Patent No.: US 11,748,525 B2
(45) Date of Patent: *Sep. 5, 2023

(54) SYSTEMS AND METHODS FOR GENERATING TEXTILES WITH REPEATING PATTERNS

(71) Applicant: Milliken & Company, Spartanburg, SC (US)

(72) Inventors: Scott R. Parry, Spartanburg, SC (US); Lisa R. Bailey, Greer, SC (US); Ellis C. Blanton, Gaffney, SC (US); Kristin M. Gruenefeld, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,651

(22) Filed: May 2, 2022

(65) Prior Publication Data
US 2022/0253566 A1 Aug. 11, 2022

Related U.S. Application Data

(63) Continuation of application No. 16/953,405, filed on Nov. 20, 2020, now Pat. No. 11,361,117, which is a
(Continued)

(51) Int. Cl.
*G06F 30/00* (2020.01)
*G06F 113/12* (2020.01)
*G06F 3/0482* (2013.01)

(52) U.S. Cl.
CPC ............ *G06F 30/00* (2020.01); *G06F 3/0482* (2013.01); *G06F 2113/12* (2020.01)

(58) Field of Classification Search
CPC ....... G06F 30/00; G06F 2113/12; A41H 3/00; A41H 3/007
See application file for complete search history.

(56) References Cited

U.S. PATENT DOCUMENTS 5,965,235 A 10/1999 McGuire
6,148,496 A 11/2000 McGuire
(Continued)

OTHER PUBLICATIONS

Geoffrey Edwards ; Mir Abolfazl Mostafavi ; David Duguay, "Voronoi Tiling, Digital Fabric Printing and Interactive eGarments—Designing the iBody", Voronoi Diagrams in Science and Engineering (ISVD), 2010 International Symposium on, IEEE Piscataway, NJ, USA, Piscataway, NJ, USA, (Jun. 28, 2010) ISBN 978-1-4244-7606-0, pp. 205-211, XP031715000.
(Continued)

*Primary Examiner* — Nathan E Durham
(74) *Attorney, Agent, or Firm* — Brenda D. Wentz

(57) ABSTRACT

Systems and methods generating textiles with repeating design elements based at least in part on Voronoi diagrams are provided. In one example implementation, the method can include generating a plurality of seed points in a graphic area. The seed points are utilized to create a Voronoi diagram. A Voronoi diagram is thereafter propagated within the graphic area based upon the seed points. The method also includes receiving a first user input defining a design area. The design area includes a plurality of boundaries within the graphic area. The design area is then correlated to a textile segment and a textile design is generated by replicating the cells in the design area. The cells that intersect the boundaries of the design area are replicated with identical instances placed at the adjacent sides of the design area and the corners of the design area.

7 Claims, 12 Drawing Sheets

Related U.S. Application Data continuation of application No. 16/385,065, filed on Apr. 16, 2019, now Pat. No. 10,885,233.

(60) Provisional application No. 62/661,169, filed on Apr. 23, 2018.

(56) References Cited

U.S. PATENT DOCUMENTS

| | | |
|---|---|---|
| 6,193,918 B1 | 2/2001 | McGuire |
| 6,254,965 B1 | 7/2001 | McGuire |
| 6,421,052 B1 | 7/2002 | McGuire |
| 6,602,454 B2 | 8/2003 | McGuire |
| 6,773,647 B2 | 8/2004 | McGuire |
| 6,804,573 B2 | 10/2004 | Goldman |
| 6,872,342 B2 | 3/2005 | Giachetto |
| 6,881,471 B2 | 4/2005 | Toussant |
| 6,894,705 B1 * | 5/2005 | Kalantari ............ G06T 11/203 345/643 |
| 6,897,869 B1 | 5/2005 | Bednar |
| 7,612,847 B2 | 11/2009 | Kanoh |
| 7,787,079 B2 | 8/2010 | Kanoh |
| 7,855,766 B2 | 12/2010 | Kanoh |
| 7,932,904 B2 | 4/2011 | Branets |
| 2003/0139840 A1 | 7/2003 | Magee |
| 2004/0036693 A1 | 2/2004 | Yoon |
| 2014/0182170 A1 | 7/2014 | Wawrousek |
| 2014/0349039 A1 | 11/2014 | Finell |

OTHER PUBLICATIONS

Muath Sabha et al, "Feature-Based Texture Synthesis and Editing USing Voronoi Diagrams", Voronoi Diagrams, 2009. ISVD '09. Sixth International Symposium on, IEEE, Piscataway, NJ, USA, (Jun. 23, 2009), ISBN 978-1-4244-4769-5, pp. 165-170, XP031586941.
Patent Cooperation Treay PCT International Search Report. dated Jul. 16, 2019. International Application No. PCT/US2019/027796. International Filing Date: Apr. 17, 2019 (4 pages).

* cited by examiner

SYSTEMS AND METHODS FOR GENERATING TEXTILES WITH REPEATING PATTERNS

CROSS REFERENCE TO RELATED APPLICATIONS

This application is a continuation of and claims priority to U.S. patent application Ser. No. 16/953,405, entitled "Systems and Methods For Generating Textiles With Repeating Patterns," which was filed on Nov. 20, 2020, which is a continuation of and claims priority to U.S. patent application Ser. No. 16/385,065, entitled "Systems and Methods For Generating Textiles With Repeating Patterns," which was filed on Apr. 16, 2019, which claims priority to U.S. Provisional Patent Application No. 62/661,169, entitled "Systems and Methods For Generating Textiles With Repeating Patterns," which was filed on Apr. 23, 2018, all of which are entirely incorporated by reference herein.

FIELD

The present disclosure relates generally to systems and methods for generating textiles with repeating patterns or design elements.

BACKGROUND

Textiles can be important building components or design elements that are frequently relied upon to unify, define and enhance a specific interior building design concept. Repeating patterns can be applied to or incorporated into textiles, textile segments (i.e., textile pieces) or other interior building components or design elements, such as flooring, drapery, ceiling tiles, wall coverings, and furniture upholstery. For instance, floor coverings can be utilized to define areas within an open floor plan and can also be utilized to unify spaces in divided or compartmentalized floor plans. Modular floor coverings or modular carpeting (e.g., a textile segment, carpet tiles, panels or squares) has become a product that is commonly utilized by interior designers, manufacturers and building owners, particularly in commercial spaces. In some instances, modular carpeting is used because it is possible to mimic the appearance of conventional broadloom carpeting but, at the same time, provide practical means by which localized portions of the carpeting can be easily removed to access under-floor building components (e.g., under-floor cable trays, other wiring and plumbing) or can be easily replaced in the event of damage, excessive wear, staining and the like.

Utilizing modular floor coverings can be more convenient for building owners or on-site building maintenance staff in that modular floor coverings offer easier, less labor intensive and less costly transportation and maintenance options. Modular floor coverings can be manufactured in a variety of sizes, such that modular flooring can be easily transported, installed and stored so that the modular floor coverings can be easily removed, replaced and repaired. Modular floor coverings can be delivered in smaller, more fuel efficient vehicles and, due to smaller dimensions, can be easier to maneuver into spaces, such as through tight doorways or hallways, where rolls of floor coverings often present a challenge for transportation. Additionally, in many situations modular floor covering maintenance, repair or replacement can be performed by a single employee or maintenance staff member.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for generating designs for textiles. The method includes generating, by one or more computing devices, a plurality of seed points in a graphic area. The method includes propagating, by the one or more computing devices, a Voronoi diagram within the graphic area based upon the seed points. The propagated Voronoi diagram includes a plurality of cells. The method includes providing, by the one or more computing devices, the Voronoi diagram for display within a user interface and receiving, using the one or more computing devices, a first user input via the user interface. The first user input defines a design area with a plurality of boundaries within the graphic area and the design area includes a sub-set of the plurality of cells. The method includes correlating, using the one or more computing devices, the design area to a textile segment and generating, using the one or more computing devices, a textile design, using the one or more computing devices, by replicating the cells of the design area.

Another example aspect of the present disclosure is directed to a system for providing textile designs utilizing Voronoi diagrams. The system includes one or more processors and a machine-readable medium storing computer-readable instructions, which when executed by the processors, cause the processors to perform operations. The operations performed by the processors include generating a plurality of seed points in a graphic area and propagating a Voronoi diagram within the graphic area based upon the seed points. The propagated Voronoi diagram includes a plurality of cells. The operations performed by the processors include receiving a first user input via a user interface defining a design area with a plurality of boundaries within the graphic area. The design area includes a sub-set of the plurality of cells. The operations performed by the processors include correlating the design area to a textile segment and generating a textile design, using the one or more computing devices, by replicating the cells of the design area.

Another example aspect of the present disclosure is directed to a machine-readable medium storing computer-readable instructions, which when executed by a machine, cause the machine to perform operations. The operations performed by the machine include generating, using the one or more computing devices, a plurality of seed points in the graphic area. The operations performed by the machine include propagating a Voronoi diagram within the graphic area based upon the seed points. The Voronoi diagram includes a plurality of cells. The operations performed by the machine include providing the Voronoi diagram for display on a user interface. The operations performed by the machine include receiving a user input via the user interface. The user input defines a design area with a plurality of boundaries within the graphic area. The design area corresponds to a floor covering tile. The operations performed by the machine include generating a floor covering design by replicating the Voronoi cells contained in the design area.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
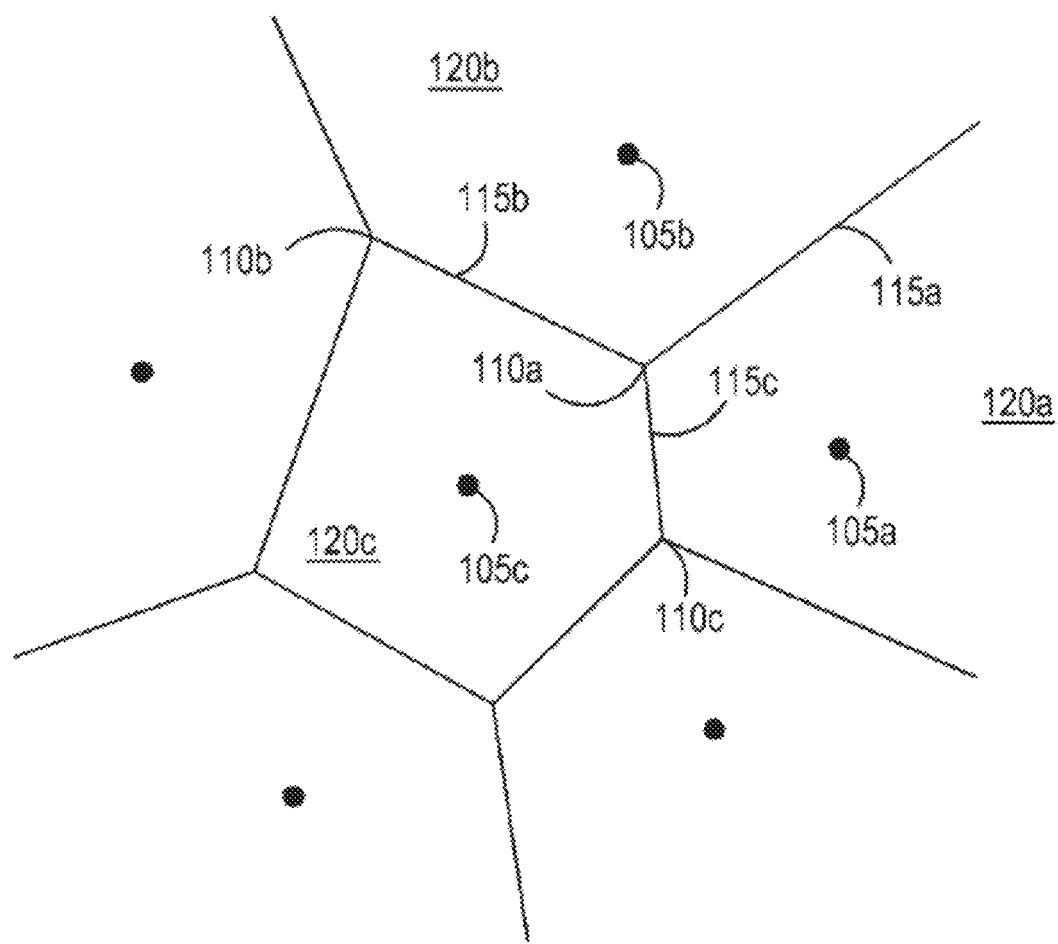
FIG. 1 depicts an example two-dimensional Voronoi diagram.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for generating textiles with repeating patterns. In some embodiments Voronoi diagrams are utilized to generate textiles with repeating patterns. Voronoi diagrams provide designers with greater flexibility and ease with which to create organic or natural designs. More specifically, because a Voronoi pattern mimics nature's tendencies for organization and position, Voronoi diagrams can be used to create patterns or designs with textiles which appear to be based upon, resemble or mimic natural or organic patterns or designs. However, since a Voronoi diagram is based on mathematical technologies, the systems and methods of the present disclosure provide designers or users with the ability to create unique or individual designs for textiles with repeating patterns, such as modular floor coverings that tile or repeat, and which result in an innovative modular product with an organic design that is comparable with geometries occurring as expected in nature. Repeating patterns can be applied to or incorporated into nearly any textile or other interior building component or design element, such as flooring, drapery, ceiling tiles, wall coverings, and furniture upholstery. For illustrative purposes, some embodiments of the present disclosure will be illustrated in the context of systems and methods for generating textiles for use as floor coverings (i.e. carpet, carpet tiles or another modular flooring system) with repeating patterns. However, the present disclosure is not limited to any particular textile product unless recited in the claims, and embodiments of the present disclosure may be suitably adapted for use with other textiles or building components, such as flooring, drapery, ceiling tiles, wall coverings, and furniture upholstery or virtually any other textile that would benefit from or could be used or manufactured with repeating patterns.

Floor coverings can be utilized by designers and building owners as design elements. For example, floor coverings can be used to unify, define and enhance a specific interior design concept. Modular floor coverings or modular carpeting (i.e., carpet tiles, panels or squares) are frequently used and have a number of known advantages (i.e., ease of installation, maintenance, repair, replacement, transport, storage, durability and versatility). Some difficulties and disadvantages can be recognized when modular floor coverings are used. For instance, the seams of modular floor coverings can be more easily seen when compared to wall-to-wall floor coverings, such as carpet rolls. Without careful installation the seams of modular floor coverings can appear uneven. One of the most common objections or difficulties with utilizing modular flooring is that after installation it can be apparent that the finished installation contains modular flooring and not a wall-to-wall floor covering.

The challenges and disadvantages of modular floor coverings can be reduced through the use of particular decorative patterns or designs on the modular floor coverings. Certain patterns or designs can be used such that they offer the capability of achieving more precise design registration and continuity between pieces or tiles that make up a modular floor covering system. This means certain patterns or designs can be used to reduce the visible difference between one tile or piece of modular flooring and the next.

Patterns and designs can be used to disguise seams or divisions between tiles or pieces of a modular floor covering system.

Organic designs can be forgiving and capable of disguising seam divisions between tiles or pieces of a modular floor covering system. Customers and manufacturers seeking to camouflage seams or joints in a modular floor covering system may find organic patterns or designs for the modular floor covering system advantageous. However, organic designs, which are based on configurations or relationships occurring in nature, often appear chaotic, inconsistent, random and are not easily replicated. Organic designs can provide an innovative modular floor covering product that allows designers and manufacturers to create unique design layouts. However, organic designs cannot be easily generated using the standard geometric or mathematical shapes customarily associated with modular floor covering tiles or pieces.

Accordingly, the systems and methods of the present disclosure, which provide designers and manufacturers with the ability to design and create modular floor covering systems, including carpet pieces or tiles, with features incorporating organic or natural design elements that can be incorporated into standard geometric floor covering tiles or pieces and that can repeat from tile-to-tile would be useful and welcomed.

Example aspects of the present disclosure are directed to systems and methods for generating repeating textile segments, such as floor coverings or tiles. In some embodiments Voronoi diagrams are utilized to generate floor coverings. Voronoi diagrams can be used in many disciplines in science and engineering. A Voronoi diagram is a partitioning of a plane into regions based on distance to a set of points in a specific subset of the plane. That set of points (called seeds, sites, nucleation points or generators) is specified by a user or is otherwise predetermined. For each seed there is a corresponding region consisting of all points closer to that seed than to any other seed. Each of these regions is a cell. The lines separating and forming each cell are always halfway between neighboring seeds. All of the cells are convex polygons formed by the cell lines. The Voronoi diagram is the pattern of convex polygons resulting from the intersection of the cell lines. A Delaunay triangle is the geometric dual of a Voronoi diagram and can also be formed from the seeds. A Delaunay triangle is formed when the seed or nucleation points become the vertices of one or more triangles within the given area or plane.

Voronoi diagrams have practical and theoretical applications to a large number of fields, including science, technology and visual art. This is because a Voronoi pattern reflects nature's tendency to favor efficiency, such as the nearest neighbor, shortest path and tightest fit. Examples of Voronoi patterns in nature are the skin of a giraffe, corn on the cob, honeycombs, foam bubbles, the cells of a leaf and a head of garlic. As such, Voronoi diagrams can be used to model a number of different biological structures, including cells and bone microarchitecture. Indeed, Voronoi tessellations work as a geometric tool to understand the physical constraints that drive the organization of biological tissues. Voronoi diagrams can also be used to study or replicate the growth patterns of forests and forest canopies. In this way, patterning or designing with Voronoi diagrams can be used to bridge the gap between nature and man-made patterns or patterns based on mathematical technologies and permit designers and manufacturers to provide an innovative modular product with an organic design that is comparable with geometries occurring as expected in nature.

Biophilic design is the practice of incorporating elements of nature into interior design. Biophilic design seeks to connect the inherent needs of humans to affiliate with nature in the modern built environment. Biophilic design focuses on those aspects of the natural world that have contributed to human health and productivity. Incorporating direct or indirect elements of nature into built or man-made environments have been demonstrated to reduce stress, blood pressure levels and heart rates, whilst increasing productivity and creativity. Biophilic design can be incorporated through use of natural or organic materials, textures, patterns and colors.

In addition to the identified biological benefits, organic designs can be forgiving and capable at disguising seam or joints between tiles or pieces of a modular floor covering system. Customers and manufacturers seeking to camouflage seams or joints in a modular floor covering system may find organic patterns or designs for the modular floor covering system advantageous. However, organic designs, which are based on configurations or relationships occurring in nature, are often chaotic, inconsistent, random and not effortlessly replicated. It can be difficult to incorporate organic designs into or with modular floor covering systems because the tiles or pieces of the modular floor covering system are inherently inorganic. This is because the tile or pieces that make up a modular floor covering system are generally manufactured in common, consistent and easily replicated geometric shapes, such as squares or rectangles. Unlike organic designs and configurations occurring in nature, the tiles or pieces of the modular floor covering system are generally manufactured such that the physical characteristics (e.g., dimensions) of each are identical. Organic designs can provide an innovative modular floor covering product that allows interior and other designers to create unique design layouts that cannot be realized using standard geometric or mathematical shapes and designs.

As such, systems and methods for providing designers and manufacturers with the ability to create modular floor covering systems, pieces or tiles with features incorporating biophilic, organic or natural design elements that can be incorporated into standard geometric floor covering tiles or pieces (e.g., square or rectangular floor covering tiles or pieces) and/or that can repeat from tile-to-tile are advantageous with regard to the installation and use of modular flooring systems.

Example aspects of the present disclosure are directed to systems and methods for generating textiles with repeating patterns such as floor coverings. In some embodiments Voronoi diagrams are utilized to generate textiles, such as floor coverings. Voronoi diagrams provide designers with greater flexibility and ease with which to create organic or natural designs. More specifically, because a Voronoi pattern mirrors nature's tendencies for organization and position, Voronoi diagrams can be used to create patterns or designs with textiles, such as floor coverings, which appear to be based upon, resemble or mimic natural or organic patterns or designs. However, since a Voronoi diagram is based on mathematical technologies, the systems and methods of the present disclosure provide designers or users with the ability to create unique or individual designs for textiles, including modular floor coverings, that tile or repeat and which result in an innovative modular product with an organic design that is comparable with geometries occurring as expected in nature.

Example aspects of the present disclosure are directed to a computing system providing a user interface for efficient generation of textiles, such as floor coverings. In some embodiments, the computing systems and methods of the present disclosure provide capabilities for users to design floor coverings with an organic pattern or design that is comparable with those occurring as expected in nature with fewer inputs to the computing system. More particularly, the computing system can have one or more computing devices and a user interface presented as a display device (e.g., a computer monitor, television, LCD display, LED display, touchscreen, etc.). The computing system can include at least one user input element (e.g., a keyboard, computer mouse, touchpad, graphics tablet, joystick, microphone, camera, stylus, remote, camera or any other known device) associated with receiving user input or commands A designer or other user (e.g., architect, artist, engineer, etc.) can interact with the user input element (e.g., through a touch or voice interaction) to cause the computing system to perform operations associated with generating textiles, textile designs, floor coverings and floor covering designs.

In some embodiments the display device can present a user interface. The user interface can be associated with the user providing commands to or the user communicating with the computing system. A user can interact (e.g., provide commands or user inputs) with the user interface element (e.g., through a touch interaction or by selecting the user interface element with a computer mouse) to cause the computing system to perform operations associated with generating floor coverings and floor covering designs.

In some embodiments, the computing system can be configured to receive, via the user interface, commands from or to communicate with the user to perform certain operations. The operations can include generating or displaying, on the display device, sites or seed points in a graphic area. The graphic area can be shown on the display device. The size of the graphic area can correspond to or be based, at least in part, on the size and resolution of the display device. The seed points can be positioned in the graphic area by the computing system. The position of the seed points can be based on preset preferences or based upon individual or a series of user inputs or commands. For instance, a default or predetermined number of seed points can be randomly placed in the graphic area or a user can specify the number of seed points to be distributed randomly in the graphic area.

The seed points can be utilized by the computing system to create a Voronoi diagram. The Voronoi diagram can be created by the computing system when the computing system determines the distances between the seed points in the graphic area. After determining the distances between the seed points, the computing system partitions the graphic area into regions based on the distance between seed points in the graphic area. More specifically, the cell line or point at which the computing system forms a cell partition or cell boundary is the location that is half way between two seed points. These cell lines intersect with one another and form a plurality of cells. Each resulting cell is a region of the graphic area that corresponds to a particular seed and the region consists of all points in the graphic area that are closer to that particular seed than to any other seed. The Voronoi diagram can be presented in the user interface on the display device.

In some embodiments, seed points can be added or relocated during the design process through a user interaction with or input through a user interface element. In response to a user interaction or user input, the computing system will determine the distances between the new or relocated seed points, partition the graphic area into regions based on the distance between the new or relocated seed points and adjust the cell lines such that the cell lines remain at locations that are half way between seed points. In this way, the designer or other user can direct, modify and/or create unique Voronoi diagrams and floor covering designs based thereon, using a simple interaction with a user interface.

In some embodiments, the user interface can include one or more interface elements. For example, the user interface can include a drawing user interface element located in a portion of the user interface (e.g., an upper left portion of the user interface). The drawing user interface element can include graphic or other indicia with the text "Draw." In response to a user interaction with the drawing user interface element, certain operations can be performed by the computing system. For instance, seed points can be added to the Voronoi diagram during the design process to allow a designer or user to achieve a specific cell design, shape or placement. The user can insert a line, curve or other shape along which seed points can be aligned or added to the Voronoi diagram. For instance, a user can utilize the drawing user interface element to draw, specify or otherwise identify a line upon which seed points can be placed or added. The user can also specify the number of seed points to be added along this line and the spacing for said seed points. In response to these user inputs, the computing system can perform certain operations to add the specified number of seed points along the user defined line and thereafter, propagate cells and generate a Voronoi diagram based upon the newly added or adjusted seed points. In this way, the designer or other user can direct, modify or create unique Voronoi diagrams and textile and floor covering designs based thereon, using a simple interaction with the user interface.

In some embodiments, the user interface can include one or more user interface elements located in a portion of the user interface which allow the user to define, draw or insert user defined or created elements, designs or shapes in the Voronoi diagram. For example, the user can define, draw or insert lines, curves or other shapes in or to the Voronoi diagram.

In some embodiments, the user interface can include a seed point editing user interface element located in a portion of the user interface (e.g., a middle left portion of the user interface). The seed point editing user interface element can include a graphic or other indicia with the text "Edit Seed Position." In response to a user interaction with the seed point editing user interface element, the seed points in the Voronoi diagram appearing in the graphic display can be controlled, modified or edited. For instance, seed points can be added, moved or removed from the graphic display. In this way, the designer or other user can direct, modify and/or create unique Voronoi diagrams and textile designs or floor covering designs based thereon, using a simple interaction with the user interface.

As another example, the user interface can include a motif user interface element located in a portion of the user interface (e.g., an upper right portion of the user interface). The motif user interface element can include a graphic or other indicia with the text "Motif." A motif can be a design, pattern, shape, graphic, color, picture, text, shape or figure. The motif interface element can be associated with uploading or placing one or more motifs in one or more user selected locations in the design area. Motifs can be uploaded to the computing system through the user interface or one of the interface elements and stored in the memory of the computing system. Through the user interface and motif user interface element, one or more motifs can be selected and placed in the design area based upon one or more characteristics of the cells or based upon one or more characteristics of the Voronoi diagram. For example, the motif can be placed in the design area based upon the boundaries of each of the cells, the center point of the cells (i.e., the seed locations), the vertices of the cells, the size of the cells or orientation of the cells. Additionally, the motif user interface element can be associated with one or more characteristics of the one or more motifs, such as size and orientation. Through the motif user interface element, the user can select and modify the characteristics of the motifs, such as size and orientation. Though the user interface element, one or more motifs can be selected and placed in the design area based upon one or more characteristics of the motif. For example, the motif can be placed in the design area based upon the size and orientation of the motif. The motif can also be placed in the design area based upon one or more characteristics of both the motif and the cell, such as the size and orientation of the motif as compared to the size and orientation of the cell. Additionally, the motif can be placed in the design area and mapped or oriented to or within a cell based at least in part as to whether or how a user defined alignment shape can be situated or located within a cell. This alignment shape can be nearly any user defined shape. For example, a user can define an alignment shape that is circular or rectangular. The alignment shape is then inserted or placed within each cell in the design area by the computing system. Computing system will perform operations to determine the orientation of the alignment shape such that the alignment shape of the largest dimensions is generated and placed within each cell, based at least in part on the boundaries of each cell. For instance, if the alignment shape is a rectangle, the computing system will determine the largest boundaries and dimensions of a rectangle that can be placed within each cell and insert said rectangular alignment shape into each cell. Thereafter, each motif can be placed and oriented within the design area based at least in part on the boundaries and orientation of the alignment shape. For instance, the computing system can perform operations to determine the orientation and size of the motif which can be placed within the rectangular alignment shape that is contained within a cell and the computing system can perform operations to insert, place, orient and size the motif such that each motif is contained within the boundaries of the rectangular alignment shape.

A user can interact with the interface elements, for instance, by touching, clicking with a computer mouse or pressing the interface element. In response to the simultaneous interaction with both interface elements, the computing system can place a motif in the graphic area and set the orientation of the motif. In this way, the number of user interactions required with a user interface can be reduced when creating textile designs or floor coverings.

The system and methods described herein may provide a number of technical effects and benefits. For instance, in some implementations, a user interface according to example aspects of the present disclosure can allow for a user to control, manipulate or create unique or individual designs for modular floor coverings in a design area and the design area can then be tiled, mirrored or repeated. This will allow a user to create floor covering design in a design area, which can be only a portion of the entire floorplan or area in which the floor covering will be installed. This allows for a design to be created by a user in a comparatively limited area of the floorplan and have that design repeated or tiled throughout the rest of the floorplan, rather than requiring the user to create a unique design for the entire floorplan. This can preserve processing and/or memory resources dedicated to receiving user input and for producing, displaying or creating modular flooring covering designs by reducing the number of user inputs or other parameters required to control, manipulate or create unique or individual designs for modular floor coverings. In addition, repeating or tiling a floor covering design based upon a design area according to example aspects of the present disclosure may help prevent errors in manufacturing and installation of modular floor coverings.

Systems and methods of the present disclosure can provide an improvement to textile design and floor covering computing technology. For instance, systems and methods can provide for designing, modifying and/or creating unique Voronoi diagrams and textile designs or floor covering designs based thereon, using a simple interaction with a user interface. This can facilitate producing, displaying or creating textiles or modular flooring covering with repeating or tiling designs which can reduce errors in manufacturing and installation of modular floor coverings. Providing the ability of a user to control, manipulate or create unique or individual designs for textiles or modular floor coverings that tile or repeat under certain conditions with a simple user interaction with an interface element can preserve processing and storage resources of the computing system. These processing and storage resources can be preserved for other functions of the system.

Referring now to the figures, example aspects of the present disclosure will be discussed in greater detail.

FIG. 1 depicts an example two-dimensional Voronoi diagram. As shown in FIG. 1, the Voronoi diagram can include a set of points or seeds (105*a*, 105*b* and 105*c*). Between each seed there exist edges (115*a*, 115*b* and 115*c*). Each edge is a perpendicular bisector of a line segment that would join its corresponding points or seeds. For example, edge 115*a* is a perpendicular bisector for the line segment that joins seeds 105*a* and 105*b*; edge 115*c* is the perpendicular bisector for seeds 105*a* and 105*c*; edge 115*b* is the perpendicular bisector between seeds 105*b* and 105*c*.

As seen in FIG. 1, the Voronoi diagram also has vertices (110*a*, 110*b* and 110*c*). These vertices represent a point that is equidistant from three points. In that regard an edge can be seen disappearing at a vertex, or, alternatively two edges can be seen as coming together to form a vertex. The edges and vertices define polygons (120*a*, 120*b* and 120*c*), with each polygon containing its corresponding seed. In that regard, a polygon (120*a*, 120*b* and 120*c*) is considered the Voronoi region for its corresponding seed.

Figure 2:
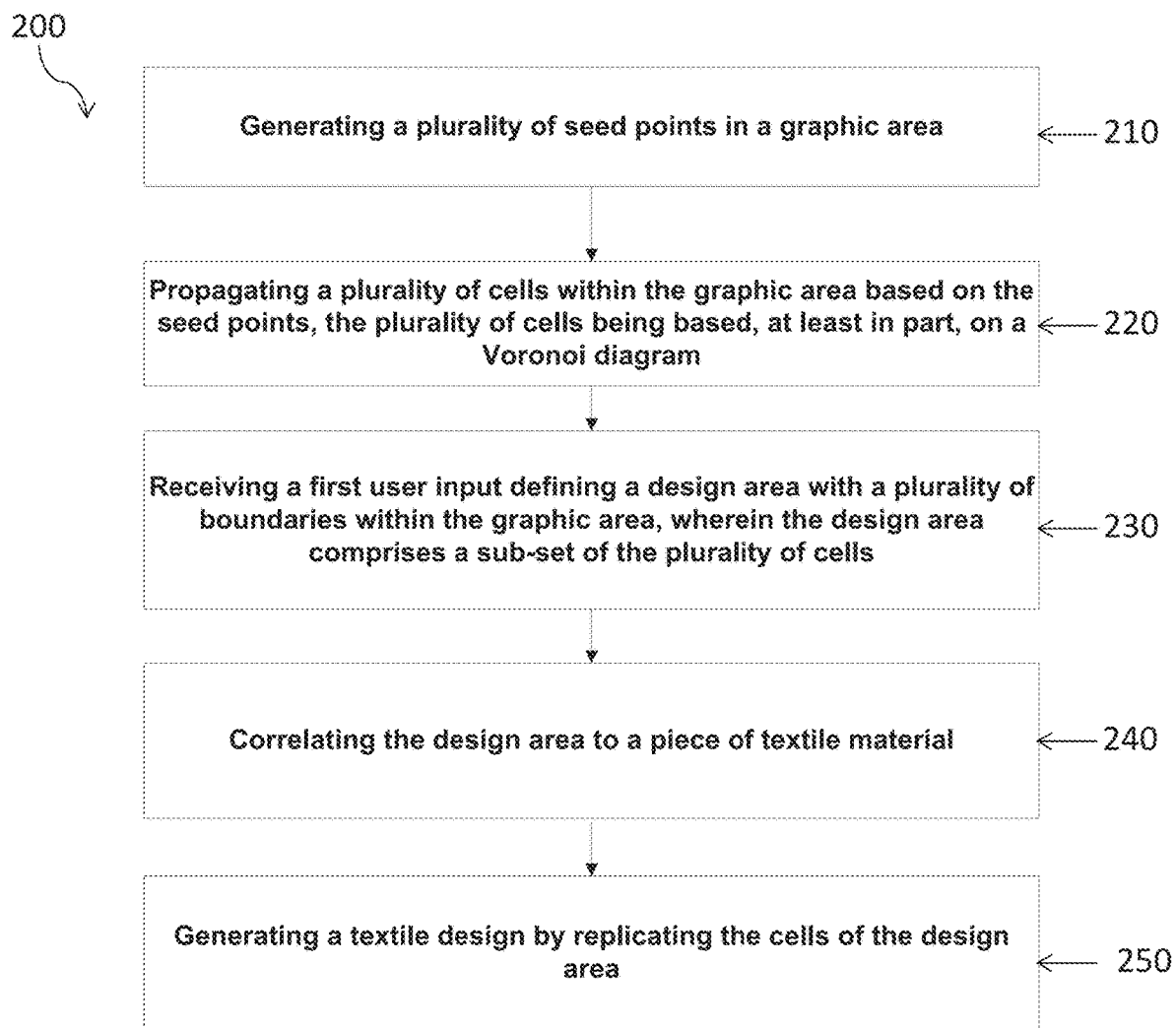
FIG. 2 depicts a flow diagram of an example method for generating textiles with repeating patterns utilizing Voronoi diagrams according to example embodiments of the present disclosure.

FIG. 2 depicts a flow diagram of an example method 200 for generating floor coverings utilizing Voronoi diagrams according to example embodiments of the present disclosure. Method 200 can be performed by one or more systems, such as system 1000, or by separate computing devices. FIG. 2 depicts steps performed in a particular order for purposes of illustration and discussion. Those of ordinary skill in the art, using the disclosure provided herein, will understand that the method discussed herein can be adapted.

At (210) the method includes generating a plurality of seed points in a graphic area. The seed points are utilized to create a Voronoi diagram. The seed points are placed in a graphic area based on preset preferences or based upon user inputs. For instance, a default or predetermined number of seed points can be randomly placed or organized in the graphic area or a user can identify a specific number of seed points to be distributed in the graphic area. Seed points can be added during the design process to allow a designer or user to achieve a desired design or result. The graphic area represents the entire plane or area which a user is viewing in generating modular floor covering designs.

At (220) the method includes propagating a Voronoi diagram within the graphic area based upon the seed points. The Voronoi diagram is created by partitioning the graphic area into regions based on distance to the seed points in a specific subset of the graphic area. For each seed there is a corresponding region consisting of all points closer to that seed than to any other. These regions are cells. The Voronoi diagram includes a plurality of cells. The system user has the ability to move one or more of the seed points to create a unique cell design and Voronoi diagram. In some embodiments a diagram of Delaunay triangulations, the geometric duo of a Voronoi diagram, can be propagated using the seed points as the vertices of a plurality of triangles. The Voronoi diagram can be provided for display in a user interface on a display device.

At (230) the method includes receiving a first user input via the user interface defining a design area. The design area includes a plurality of boundaries within the graphic area. The plurality of boundaries defines the shape of the design area. The design area can be defined by the user or the user can select a fixed geometric shape, such as a square or rectangle. Each design area is configured such that it contains a sub-set of the plurality of cells.

At (240) the method includes correlating the design area to a floor covering tile or piece. In so correlating, the size of the design area is associated with the particular shape and dimensions of a modular floor covering tile or piece. Any suitable shape or size of covering tile or piece can be used without deviating from the scope of the present disclosure. For example, carpet tiles may be cut into sizes in the range from 4 inches by 4 inches to 72 inches by 72 inches. The carpet tiles may be of the same length and width, thus forming a square shape. Or, the carpet tiles may have different dimensions such that the width and the length are not the same. For example, the carpet tiles may be a rectangular shape.

At (250) the method includes generating a modular floor covering design by replicating the cells in the design area. The cells that intersect the boundaries of the design area are fixed such that they appear to wrap around the opposite boundary of the design area. In this way, the cells that intersect the boundaries of the design area are replicated with identical instances or cells placed at the adjacent sides of the design area and the corners of the design area.

Figure 3A:
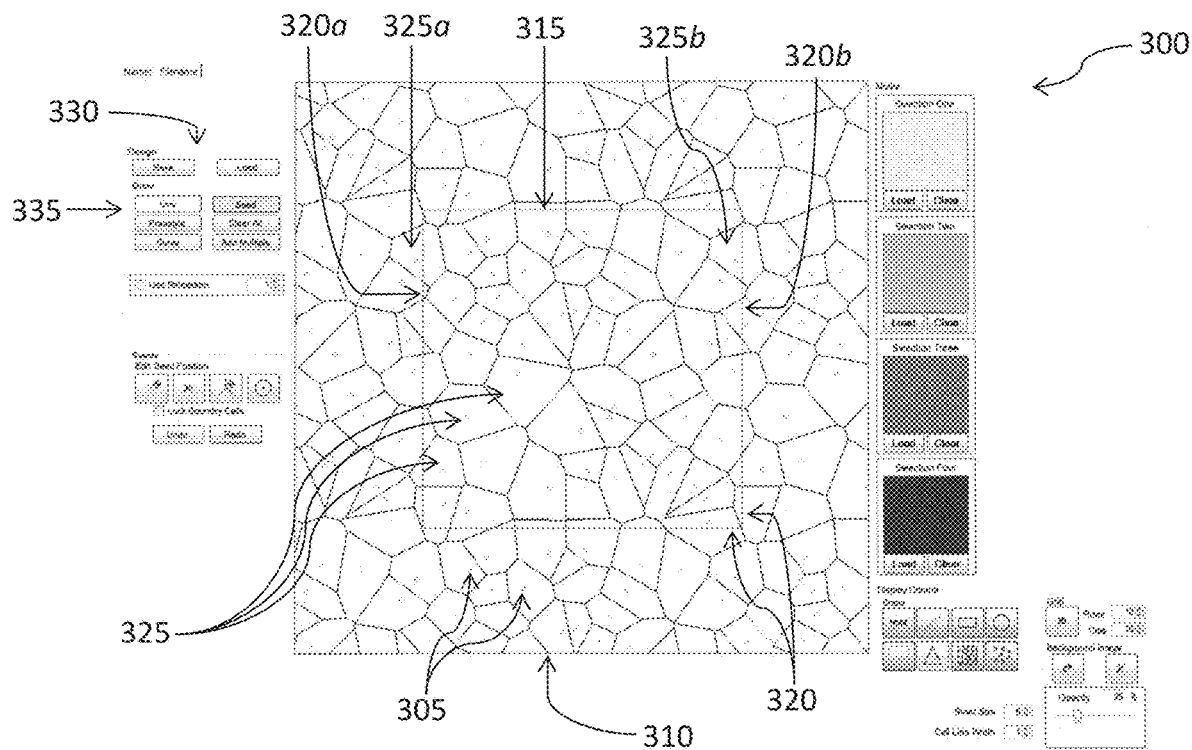
FIG. 3A depicts a screenshot of a first configuration of an example user interface for systems and methods for generating textiles with repeating patterns utilizing Voronoi diagrams according to example embodiments of the present disclosure.

FIG. 3A depicts first configuration of a screenshot of an example user interface 300 for use with the systems and methods for generating textiles, such as floor coverings, utilizing Voronoi diagrams disclosed herein. User interface 300 can be presented on a display screen of any suitable computing device or system part of a personal computer, computer monitor, tablet, smartphone, display with one or more processors or other similar device. User interface 300 can display a plurality of seed points 305 in a graphic area 310. The seed points 305 are utilized to create the Voronoi diagram depicted in FIG. 3A and which is contained in the graphic area 310.

User interface 300 also depicts a design area 315. The design area 315 includes a plurality of boundaries 320 within the graphic area. The plurality of boundaries 320 defines the shape of the design area 315. The design area 315 can be defined by the user or the user can utilize a geometric shape, such as a square or rectangle. Design area 315 is configured such that it contains a sub-set of the plurality of cells 325.

The cells 325 that intersect the boundaries 320 of the design area 315 are fixed such that they appear to wrap around the opposite boundary of the design area 315. In this way, the cells 325 that intersect the boundaries 320 of the design area 315 are replicated with identical instances or cells 325 placed at the adjacent sides of the design area 315 and the corners of the design area 315. For example cell 325a intersects boundary 320a. Cell 325a is replicated as 325b at boundary 320b which is opposite to boundary 320a.

User interface 300 can also include one or more user interface elements. User interface 300 includes a design user interface element 330. The design user interface element 330 can include graphic or other indicia with the text "Design," "Save" or "Load." In response to a user interaction (e.g., through a touch interaction or by selecting the user interface element with a computer mouse) with the design user interface element, certain operations can be performed by a computing system. For instance, data related to the design or Voronoi diagram depicted or displayed in the graphic area 310 can be saved to the memory of a computing system such that it can be used or recalled by the user or computing system. Additionally, the user can access data stored in the memory of the computing system or other computer readable media related to a design or Voronoi diagram to be depicted or displayed in the graphic area 310 of user interface 300.

User interface 300 includes a drawing user interface element 335. The drawing user interface element 335 includes graphic or other indicia with the text "Draw," "Line," "Seed," and "Curve." In response to a user interaction (e.g., through a touch interaction or by selecting the user interface element with a computer mouse) with the drawing user interface element 335, certain operations can be performed by a computing system.

Figure 3B:
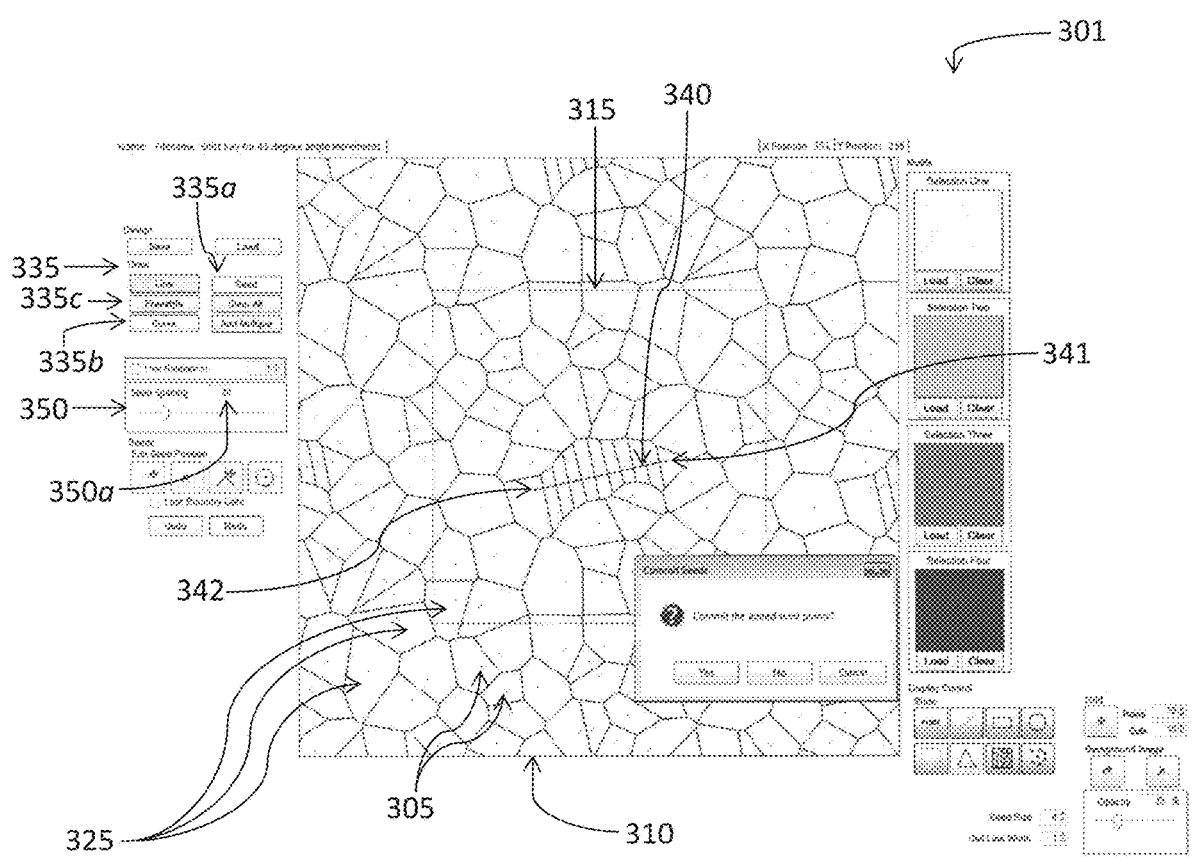
FIG. 3B depicts a screenshot of a second configuration of the example user interface of FIG. 3A for systems and methods for generating textiles with repeating patterns utilizing Voronoi diagrams according to example embodiments of the present disclosure.

FIG. 3B depicts second configuration of a screenshot of an example user interface 301 for use with the systems and methods for generating textiles, such as floor coverings, utilizing Voronoi diagrams disclosed herein. User interface 301 can be presented on a display screen of any suitable computing device or system part of a personal computer, computer monitor, tablet, smartphone, display with one or more processors or other similar device. User interface 301 can display a plurality of seed points 305 in a graphic area 310. The seed points 305 are utilized to create the Voronoi diagram depicted in FIG. 3B and which is contained in the graphic area 310.

User interface 301 includes a drawing user interface element 335. The drawing user interface element 335 includes graphic or other indicia with the text "Draw," "Line," "Seed," and "Curve." In response to a user interaction (e.g., through a touch interaction or by selecting the user interface element with a computer mouse) with the drawing user interface element 335, certain operations can be performed by a computing system. For instance, a user interaction with the graphic indicia containing the text "Seed" 335a included with the drawing user interface element 335, can cause the computing system to perform operations including adding one or more seed points 305 to the Voronoi diagram at a location in the design area 315 that is selected by a user. For example, a straight line 340 can be drawn or generated by the computing system between two or more user defined locations, such as locations 341 and 342, in the design area 315 in response to a user interaction with the graphic indicia containing the text "Line" included with the drawing user interface element 335. A user can utilize the drawing user interface element 335 to draw, specify or otherwise identify a straight line 340 upon which seed points 305 can be placed, moved or adjusted. If the user desires to adjust or move existing seed points 305 such that they are placed along the user defined straight line 340 defined following a user interaction with the graphic indicia containing the text "Line" included with the drawing user interface element 335, the computing system can perform operations, including determining the cells 325 through which the straight line 340 passes and move or adjust the seed points 305 associated with said cells 325 such that they are placed along the user inserted or defined straight line 340. The user can also specify a number of seed points 305 to be added along the straight line 340 defined following a user interaction with the graphic indicia containing the text "Seed Spacing" 350 included with the drawing user interface element 335. In response to these inputs, the computing system can perform operations that include adding the user specified number of seed points along the user defined line 340 and thereafter, propagate additional cells 325 and in so doing generate a Voronoi diagram based upon the newly added, adjusted or moved seed points 305. In this way, the user can direct, modify or create unique Voronoi diagrams and textile designs or floor covering designs based thereon, using a simple interaction with the drawing user interface element 335 and the user interface 300.

A curved line can also be drawn or generated by the computing system between two or more user defined locations in the graphic area in response to a user interaction with the graphic indicia containing the text "Curve" 335b included with the drawing user interface element 335. A user can utilize the drawing user interface element 335 to draw, specify or otherwise identify a curved line upon which seed points 305 can be placed, moved or adjusted. If the user desires to adjust or move existing seed points 305 such that they are placed along the user defined curved line defined following a user interaction with the graphic indicia containing the text "Curve" 335b included with the drawing user interface element 335, the computing system can perform operations, including determining the cells 325 through which the curved line passes and move or adjust the seed points 305 associated with said cells 325 such that they are placed along the user inserted or defined curved line. The user can also specify a number of seed points 305 to be added along the curved line defined following a user interaction with the graphic indicia containing the text "Curve" 335b included with the drawing user interface element 335. In response to these inputs, the computing system can perform operations that include adding the user specified number of seed points along the user defined line and thereafter, propagate additional cells 325 and in that way generate a Voronoi diagram based upon the newly added, adjusted or moved seed points 305. In this way, the user can direct, modify or create unique Voronoi diagrams and textile or floor covering designs based thereon, using a simple interaction with the drawing user interface element 335 and the user interface 300.

Other geometric shapes (e.g., triangles, rectangles, trapezoid, convex octagon, concave pentagon, etc.) can be drawn or generated by the computing system at one or more user defined locations in the design area 315 in response to a user interaction with the drawing user interface element 335. A user can utilize the drawing user interface element 335 to draw, specify or otherwise identify a geometric shape, the boundaries of which define locations at which seed points 305 can be placed, moved or adjusted. If the user desires to adjust or move existing seed points 305 such that they are placed along the user defined geometric shape defined following a user interaction with the drawing user interface element 335, the computing system can perform operations, including determining the cells 325 through which the boundaries of the geometric shape passes and move or adjust the seed points 305 associated with said cells 325 such that they are placed along the boundaries of the user inserted or defined geometric shape. The user can also specify a number of seed points 305 to be added along the boundaries of the user defined geometric shape following a user interaction with the drawing user interface element 335. In response to these inputs, the computing system can perform operations that include adding the user specified number of seed points along the boundaries of the user defined geometric shape and thereafter, propagate additional cells 325 and in that way generate a Voronoi diagram based upon the newly added, adjusted or moved seed points 305. In this way, the user can direct, modify or create unique Voronoi diagrams and textile or floor covering designs based thereon, using a simple interaction with the drawing user interface element 335 and the user interface 300.

In response to a user interaction (e.g., through a touch interaction or by selecting the user interface element with a computer mouse) with the drawing user interface element 335, certain additional operations can be performed by a computing system. For instance, a user interaction with the graphic indicia containing the text "Freestyle" 335c included with the drawing user interface element 335 can permit a user to add seed points 305 in real-time based on and simultaneously with a user interaction in the design area 315.

For example, a user can specify the spacing between each seed point 305 to be added in real-time based on a user interaction in the design area 315. Seed spacing can be a user identified amount or unit of measure. The user specified seed spacing can be a scale or be proportional to the size or dimensions of the graphic area 310 or design area 315. For example, the seed spacing can be based on any unit of measure and can correspond to the unit of measure or scale that is represented by or applied to the design area 315. For instance if the dimensions of the design area 315 are represented or shown in inches, the user can specify the seed spacing by interacting with the graphic indicia containing the text "Seed Spacing" 350 and set the seed spacing in a unit of measure, such as inches. For example, the "Seed Spacing" 350 can be set to unit of measure of every twenty (20) inches as shown in graphic indicia 350a.

After identifying the seed spacing at graphic indicia 350 or 350a, a user can utilize the graphic indicia containing the text "Freestyle" to cause the computing system to perform operations that including adding seed points 305 in real-time and at user specified locations in the design area 315 in response to a user interaction (e.g., through a touch interaction or by selecting the user interface element with a computer mouse) with the design area 315. For example, a user interaction can be the user moving the cursor associated with a computer mouse in the design area 315 in any shape or direction. In response to the user movement of the cursor, the computing system performs operations to include adding a seed point 305 in the design area 315 based upon the user defined see spacing parameter 350a identified at graphic indicia 350. In this way, the user can add seeds based on fewer user inputs and in real time with or simultaneous to a user input (e.g., the user movement of the cursor in the design area 315).

In this way, the user can direct, modify or create unique Voronoi diagrams and textile or floor covering designs based thereon, using a simple interaction with the drawing user interface element 335 and the user interface 300. Additionally, in this way the computing systems and methods of the present disclosure provide capabilities for users to design textiles or floor coverings with an organic pattern or design that is comparable with those occurring as expected in nature with fewer inputs to the computing system.

Figure 4:
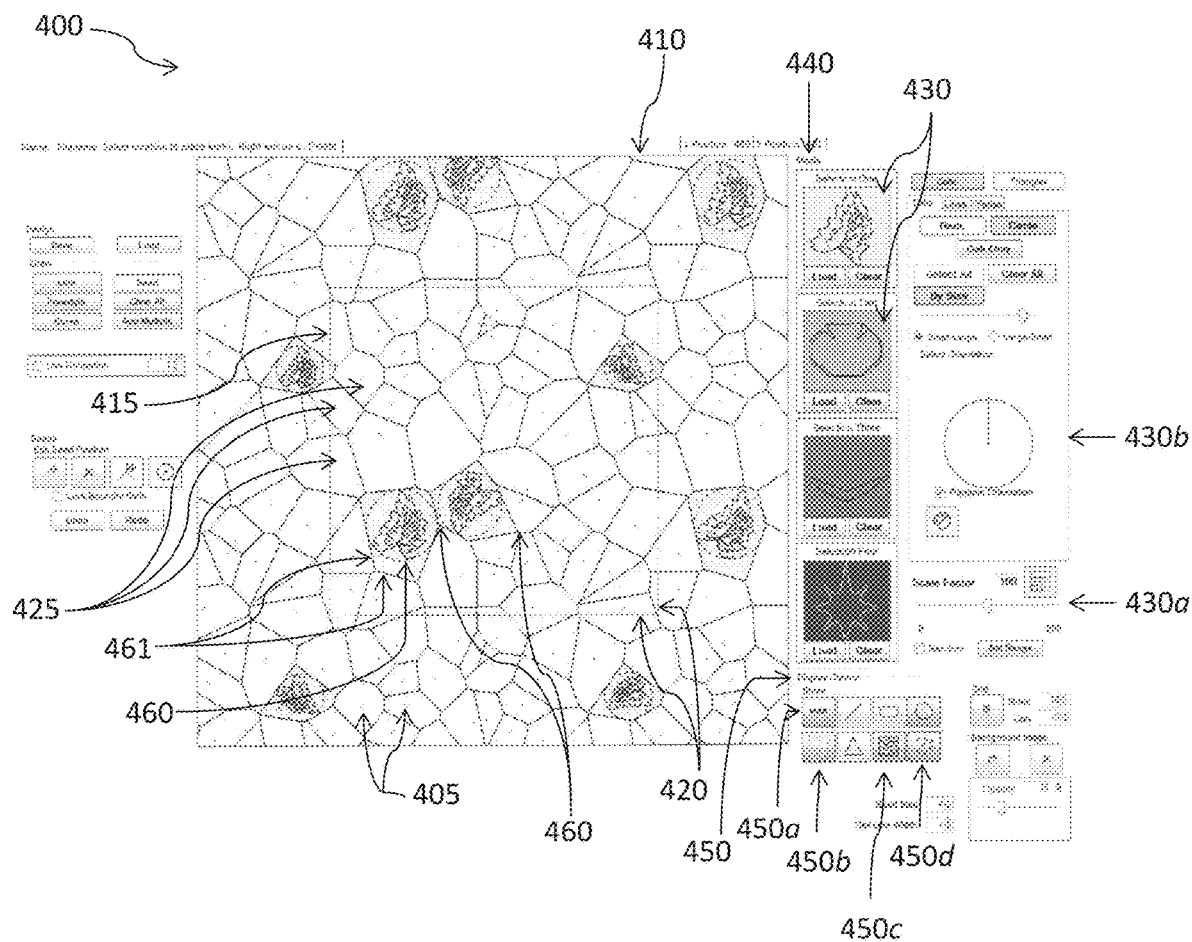
FIG. 4 depicts a screenshot of an example user interface for systems and methods for generating textiles with repeating patterns utilizing Voronoi diagrams according to example embodiments of the present disclosure.

FIG. 4 depicts a screenshot of an example user interface 400 for use with the systems and methods for generating textiles, such as floor coverings, utilizing Voronoi diagrams disclosed herein. User interface 400 includes seed points 405 utilized to create a Voronoi diagram with a plurality of cells 425 and which are contained in graphic area 410. User interface 400 also depicts a design area 415. Design area 415 includes a plurality of boundaries 420. The boundaries 420 define the shape of the design area 415. Each design area is configured such that it contains a sub-set of the plurality of cells 425.

User interface 400 can also include one or more user interface elements. User interface 400 includes a motif user interface element 440 located in a portion of the user interface (e.g., an upper right portion of the user interface). The motif user interface element 440 can include a graphic or other indicia with the text "Motif." The motif interface element 440 can be associated with uploading or placing one or more motifs 430 in one or more user selected locations in the design area 415. Motifs 430 can be uploaded to the computing system and stored in the memory of the computing system. Through motif user interface element 440, one or more motifs can be selected and placed in the design area 415 based on or with respect to certain parameters or characteristics of the cells 425. For example, the motifs 430 can be placed with respect to the location of the vertices 460 of the cells 425. Motifs 430 can also be placed such that motif 430 is entirely within the boundaries of a cell 425. Motifs 430 can be uploaded by a user to a computing system, such as system 1000, and stored in the memory of the computing system.

Motifs 430 can be placed in the design area 415 based upon the size and orientation of the motifs 430. Motifs 430 can also be placed in the design area based upon one or more characteristics of both the motif 430 and the cells 425, such as the size and orientation of the motif 430 as compared to the size and orientation of the cell 425. Additionally, the motif 430 can be placed in the design area and mapped or oriented to or within a cell 425 based, at least in part, on whether or how a user defined alignment shape 460 can be situated or located within a cell 425. This alignment shape 460 can be virtually any user defined shape. For example, a user can define an alignment shape 460 that is circular (as shown in FIG. 4) or rectangular. The alignment shape 460 can be inserted or placed within certain cells 425 in the design area 415 by the computing system or as selected by the user. Computing system will perform operations to determine the orientation and placement of the alignment shape 460 in the cell 425 such that the alignment shape 460 has certain characteristics based at least in part on the boundaries 461 of each cell. For instance, if the alignment shape 460 is a circle (as shown in FIG. 4), the computing system can determine the largest circular alignment shape 460 that can be placed within a cell 425 and insert said circular alignment shape 460 into a cell 425 such that the circular alignment shape is contained within the boundaries of the cell 425, such as boundaries 461. Each motif 430 can be placed and oriented within the design area 415 based at least in part on the alignment shape 460. For instance, the computing system can perform operations to determine the orientation and size of the motif 430 which can be placed within the circular alignment shape 460 that is contained within a cell 425 and the computing system can perform operations to insert, place, orient and size or scale the motif 430 such that each motif 430 is contained within the boundaries of the circular alignment shape 460.

In some embodiments, a user can select and modify the characteristics of the motifs 430, such as size, orientation, color and precise placement with respect to the cells 425. For example, in response to a user interaction with a first graphic indicia 430a in the motif user interface element 440, the user can select and modify the size of the motif 430. In response to a user interaction with a second graphic indicia 430b in the motif user interface element 440, the user can select and modify the orientation characteristics of the motif 430. The orientation of the motifs 430 can be randomly determined by the computing system or defined by the user based on one or more user inputs. All of the motifs 430 shown in graphic display 410 may be oriented in the same direction based on a user input or the user can select certain motifs 430, based on size, location or other parameters, to which a certain orientation (e.g., turned right, left, up or down) will apply.

User interface 400 also includes a display user interface element 450 located in a portion of the user interface (e.g., a lower right portion of the user interface). The display user interface element 450 can include a graphic or other indicia with the text "Display Control" or "Show." The display user interface element 450 can be associated with displaying one or more items in the graphic area 410. For example, in response to a user interaction with a third graphic indicia 450a the user can determine whether the motif 430 is or is not displayed in graphic area 410. In response to a user interaction with a fourth graphic indicia 450b the user can determine whether the boundaries 420 of the design area 415 are or are not displayed in graphic area 410. In response to a user interaction with a fifth graphic indicia 450c the user can determine whether the cells 425 and their associated boundaries are or are not displayed in graphic area 410. In response to a user interaction with a sixth graphic indicia 450d the user can determine whether the seeds 405 are or are not displayed in graphic area 410.

Figure 5:
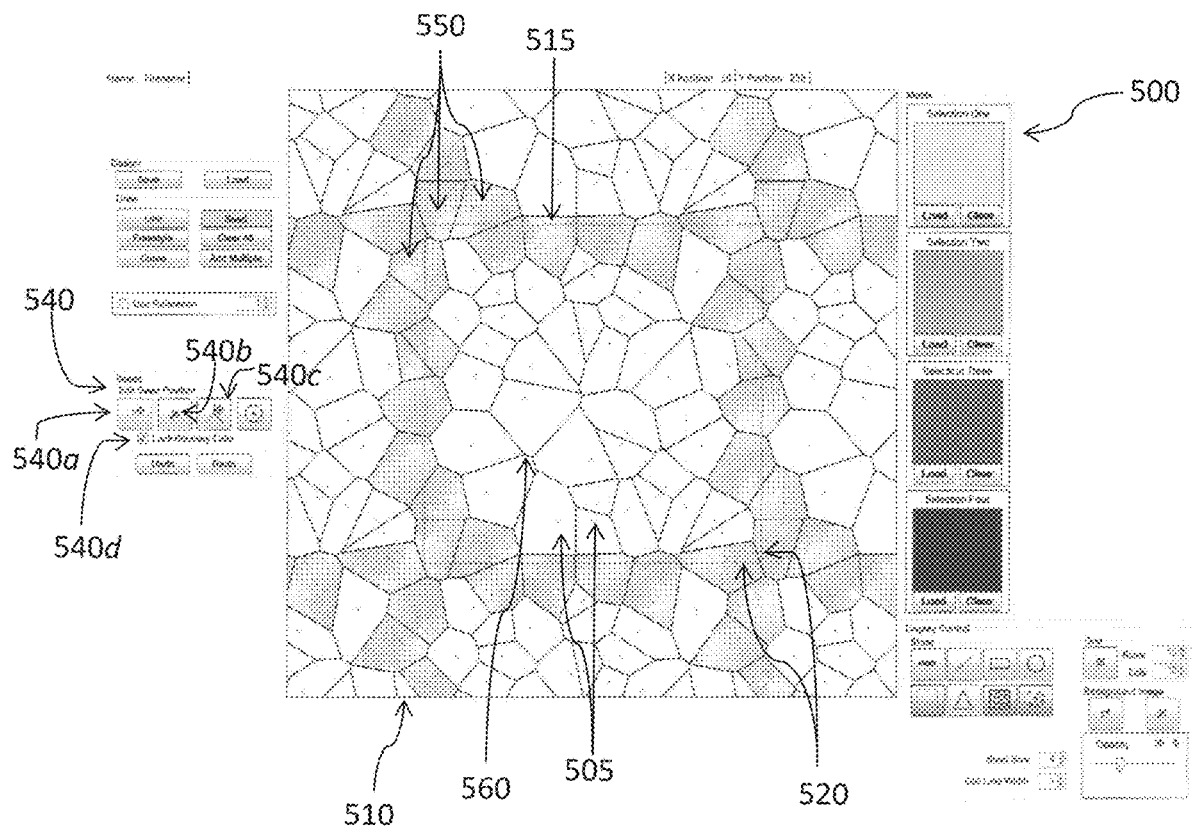
FIG. 5 depicts a screenshot of an example user interface for systems and methods for generating textiles with repeating patterns utilizing Voronoi diagrams according to example embodiments of the present disclosure.

FIG. 5 depicts a screenshot of an example user interface 500 for use with the systems and methods for generating textiles, such as floor coverings, utilizing Voronoi diagrams disclosed herein. User interface 500 can also include one or more user interface elements. User interface 500 includes a seed point editing user interface element 540. The seed point editing user interface element 540 includes graphic or other indicia with the text "Seeds" or "Edit Seed Position." In response to a user interaction with the seed point editing user interface element 540, seed points located in the design area 515, such as seed points 505, of the Voronoi diagram appearing in the graphic display 510 can be controlled, modified or edited. In response to a user interaction with a first graphic indicia 540a in seed point editing user interface element 540, user selected seed points in the graphic display can be moved to one or more user selected locations in the graphic display 510. In response to a user interaction with a second graphic indicia 540b in seed point editing user interface element 540, user selected seed points in the graphic display can be removed or deleted from design area 515. In response to a user interaction with a third graphic indicia 540c in seed point editing user interface element 540, user selected vertex of a cell, such as vertex 560, can be moved to a user selected location in the graphic display 510. In response to a user interaction with a fifth graphic indicia 540d in seed point editing user interface element 540, the boundary cells 550 that intersect the boundaries 520 defining the design area 515 can be locked such that the computing system prevents user inputs from modifying, editing or changing the boundary cells 550 in the graphic display.

Figure 6:
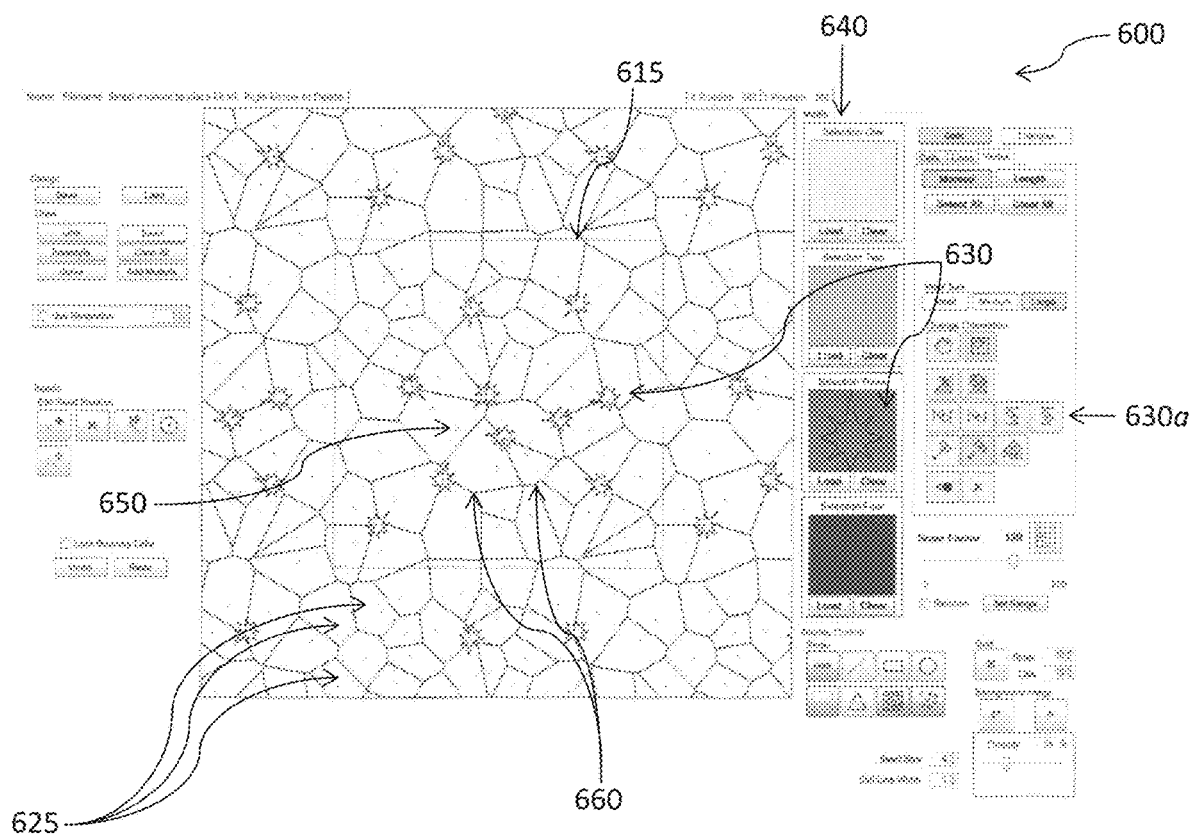
FIG. 6 depicts a screenshot of an example user interface for systems and methods for generating textiles with repeating patterns utilizing Voronoi diagrams according to example embodiments of the present disclosure.

FIG. 6 depicts a screenshot of an example user interface 600 for use with the systems and methods for generating textiles, such as floor coverings, utilizing Voronoi diagrams disclosed herein. User interface 600 can also include one or more user interface elements. User interface 600 depicts another configuration of a motif user interface element 640 located in a portion of the user interface (e.g., an upper right portion of the user interface). The motif user interface element 640 can include a graphic or other indicia with the text "Motif." The motif interface element 640 can be associated with uploading or placing one or more motifs 630 in one or more user selected locations in the design area 615. Motifs 630 can be uploaded to the computing system and stored in the memory of the computing system. Through motif user interface element 640, one or more motifs can be selected and placed in the design area 615 based on or with respect to certain parameters of the cells 625. For example, the motifs 630 can be placed with respect to the vertices 660 of the cells 625. In the example depicted in FIG. 6, the motif 630 are placed with respect to the vertices 660 (i.e., where the center point of the motif 660 is placed on the user selected vertex 660). Motifs 630 can also be placed such that the motif 630 is entirely within the boundaries of a cell 625. Motifs 630 can be uploaded by a user to a computing system, such as system 1000, and stored in the memory of the computing system.

In response to a user interaction with a plurality of graphic indicia 630*a* in the motif user interface element 640, the user can select and modify the orientation characteristics of the motifs 630. For example, the orientation can be random or randomized within a user defined angle range (e.g., randomly oriented within an angle of 90 degrees). The orientation of the motifs 630 can also be set based on a user selected or defined orientation point 650 located within the design area 615. For instance, all of the motifs 630 can be oriented towards or away from the orientation point 650. Also, all of the motifs 630 can be oriented in any particular direction (e.g., up, down, left or right).

Figure 7:
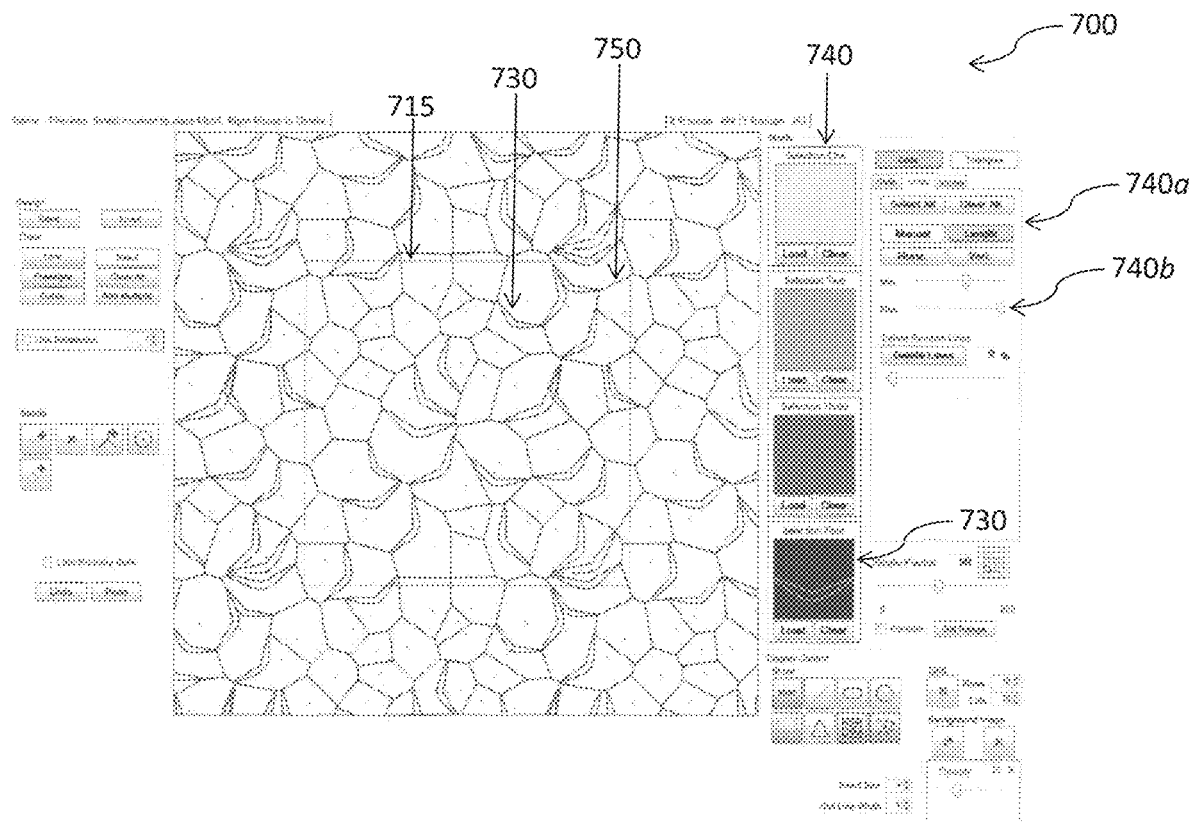
FIG. 7 depicts a screenshot of an example user interface for systems and methods for generating textiles with repeating patterns utilizing Voronoi diagrams according to example embodiments of the present disclosure.

FIG. 7 depicts a screenshot of an example user interface 700 for use with the systems and methods for generating textiles, such as floor coverings, utilizing Voronoi diagrams disclosed herein. User interface 700 can also include one or more user interface elements. User interface 700 depicts a configuration of a motif user interface element 740 located in a portion of the user interface (e.g., an upper right portion of the user interface). The motif user interface element 740 can include a graphic or other indicia with the text "Motif." The motif interface element 740 can be associated with uploading or placing one or more motifs 730 in one or more user selected locations in the design area 715. In response to a user interaction with a plurality of graphic indicia 740*a* in the motif user interface element 740, the user can select certain cell lines or cell boundaries 750 and replace the cell lines or boundaries 750 with the motif 730. For example, the cell lines 750 that are replaced with the motif 730 can be user selected or defined or can include all cell lines that have a certain length, have a length that is within a user defined range or are oriented in a certain direction (e.g., near horizontal or near vertical) or are within a user defined range or a certain direction (e.g., within 10 degrees of horizontal). The length of the cell lines 750 that are replaced by the motif 730 can be within a predetermined range or a range defined by the user. For instance, the user can select a minimum length and maximum length for the cell lines 750 to define a range at graphic indicia 740*b*. The computing system will determine which cell lines are within the user defined range and replace all cell lines 750 within the range with motif 730.

Figure 8:
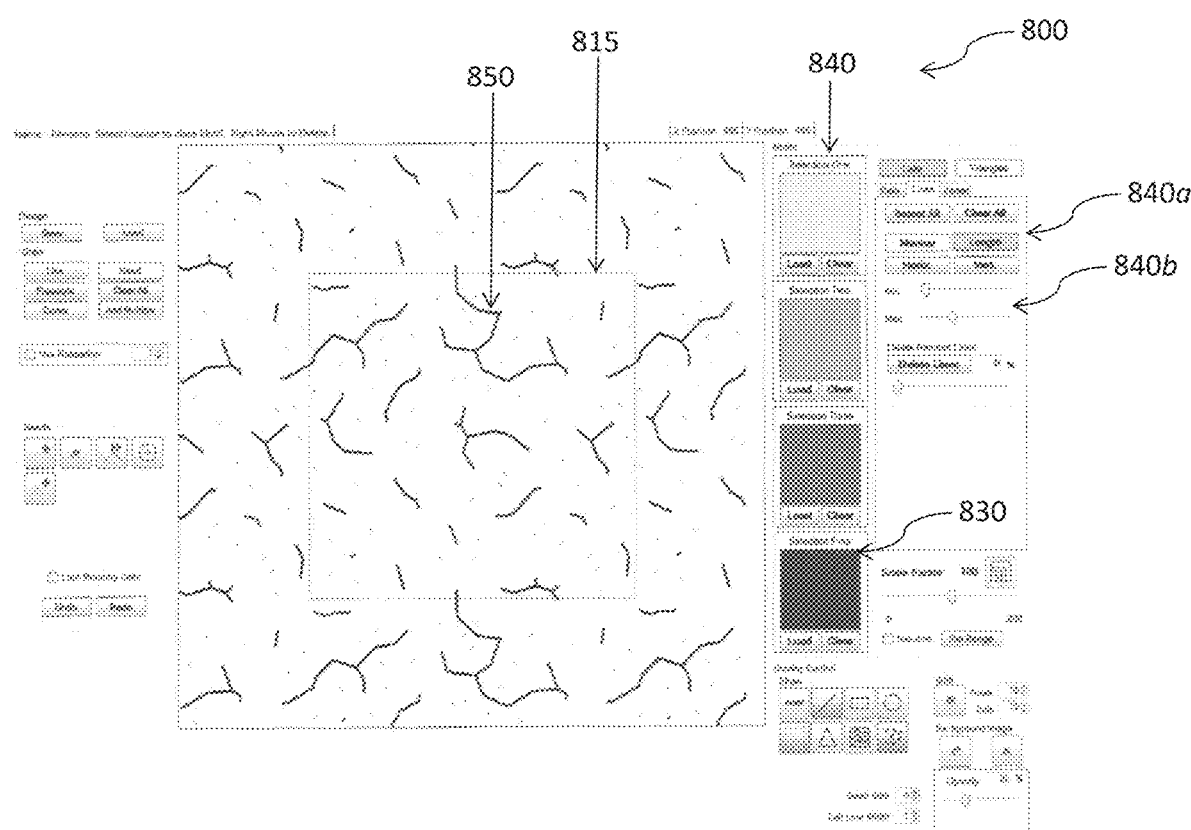
FIG. 8 depicts a screenshot of an example user interface for systems and methods for generating textiles with repeating patterns utilizing Voronoi diagrams according to example embodiments of the present disclosure.

FIG. 8 depicts a screenshot of an example user interface 800 for use with the systems and methods for generating textiles, such as floor coverings, utilizing Voronoi diagrams disclosed herein. User interface 800 can also include one or more user interface elements. User interface 800 depicts a configuration of a motif user interface element 840 located in a portion of the user interface (e.g., an upper right portion of the user interface). The motif user interface element 840 can include a graphic or other indicia with the text "Motif." The motif interface element 840 can be associated with one or more motifs 830, which can be certain characteristics such as a color, line weight or line type.

User interface 800 can also include a cell boundary or line user interface element 840*a* including graphic or other indicia with the text "Manual," "Length," "Horizontal," and "Vertical." In response to a user interaction with the line user interface element 840*a*, certain operations can be performed by the computing system. For instance, the user can select certain cell lines 850 to be displayed in the design area 815 based, at least in part, on certain characteristics of the cell lines 850, such as color, orientation (e.g., near vertical or near horizontal) and length. For example, the cell lines 850 that are shown in design area 815 can be user selected (e.g., in response to a user interaction with the portion of the line user interface element 840*a* including graphic or other indicia with the text "Manual") or can include all cell lines that have a certain length (e.g., in response to a user interaction with the portion of the user interface element 840*a* including graphic or other indicia with the text "Length") or are oriented in a certain direction (e.g., near horizontal or near vertical in response to a user interaction with the portion of the user interface element 840*a* including graphic or other indicia with the text "Vert." or "Horiz."). The length of the cell lines 850 that are to be displayed in design area 815 can be within a predetermined range or a range defined by the user. For instance, the user can select a minimum length and maximum length for the cell lines 850 and define a range at graphic indicia 840*b*. The computing system will determine which cell lines are within the user defined range and display only cell lines 850 within the range in design area 815.

Figure 9:
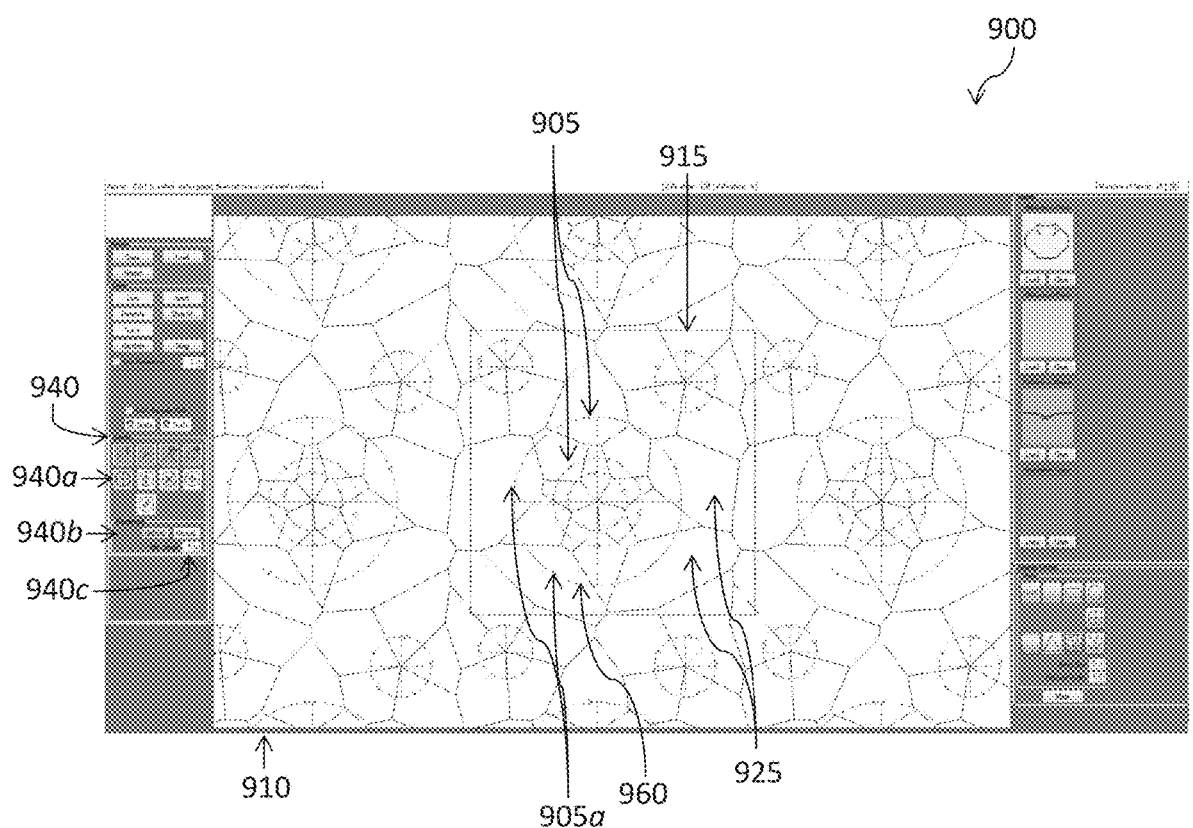
FIG. 9 depicts a screenshot of an example user interface for systems and methods for generating textiles with repeating patterns utilizing Voronoi diagrams according to example embodiments of the present disclosure.

FIG. 9 depicts a screenshot of an example user interface 900 for use with the systems and methods for generating floor coverings utilizing Voronoi diagrams disclosed herein. User interface 900 can also include one or more user interface elements. User interface 900 includes a seed point editing user interface element 940. The seed point editing user interface element 940 includes graphic or other indicia with the text "Seeds." In response to a user interaction with the seed point editing user interface element 940, seed points located in the design area 915, such as seed points 905, of the Voronoi diagram appearing in the graphic display 910 can be controlled, modified or edited. In response to a user interaction with a first graphic indicia 940*a* in seed point editing user interface element 940, seed points 905 in the graphic display can be moved to or placed based on an alignment circle 960. In response to a user interaction with a first graphic indicia 940*a*, an alignment circle 960 can be generated by the computing system and displayed in the design area 915 based upon a user input which defines the location and size of the alignment circle 960. For instance, the location and size of the alignment circle 960 can be user selected and can be created by the computing system in response to user interactions with the user interface 900, for instance, by touching, clicking with a computer mouse or pressing the interface element.

In response to a user interaction with a second graphic indicia 940*b* in seed point editing user interface element 940, the user can define the number of seed points to be placed along the alignment circle 960. For example, the user can define the number of seed points to be placed along alignment circle 960 through a user interaction with a third graphic indicia 940*c* in seed point editing user interface element 940. In response to a user interaction, the computing system can automatically and evenly place the number of seed points 905, such as seed points 905*a*, along the alignment circle 960 as defined by the user through the third graphic indicia 940*c*. The user may also manually select the locations along the alignment circle 960 to place the seed points 905 by interacting with the user interface 900, for instance, by touching, clicking with a computer mouse or pressing the interface element at the locations along the alignment circle 960 where the user desires to add place the seed points 905. In response to these inputs, the computing system can perform operations that include adding the user specified seed points along or based on the alignment circle 960 and thereafter, propagate additional cells 925 or modify the shape of existing cells 925 and generate a Voronoi diagram based upon the newly added, adjusted or moved seed points (905 and 905*a*). In this way, the user can direct, modify or create unique Voronoi diagrams and floor covering designs based thereon, using a simple interaction with the seed point editing user interface element 940 and the user interface 900.

Figure 10:
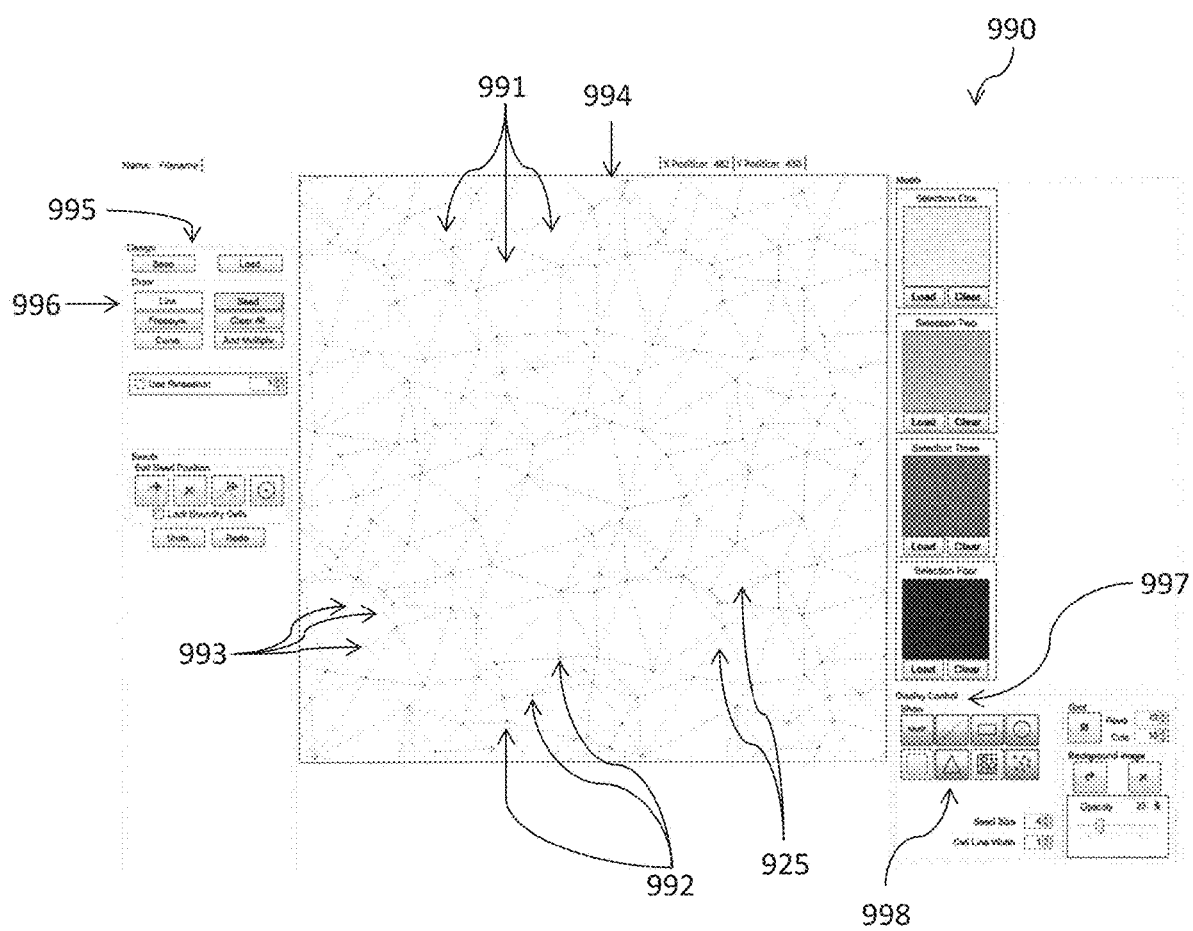
FIG. 10 depicts a screenshot of an example user interface for systems and methods for generating textiles with repeating patterns utilizing Delaunay triangles according to example embodiments of the present disclosure.

FIG. 10 depicts a screenshot of an example user interface 990 for systems and methods for generating textiles with repeating patterns utilizing Delaunay triangles 991 disclosed herein. A Delaunay triangle 991 is the geometric dual of a Voronoi diagram and can also be formed from the seeds 992. A Delaunay triangle 991 is formed when seeds 992 or nucleation points (which are the center points of the cells that form a Voronoi diagram) become vertices that form one or more triangles within the given area or plane. Delaunay triangles 991 are formed by three boundaries, such as boundaries 993, which extend between three vertices 992.

User interface 990 can be presented on a display screen of any suitable computing device or system part of a personal computer, computer monitor, tablet, smartphone, display with one or more processors or other similar device. User interface 990 can display a plurality of seed points 992 in a graphic area 994. The seed points 992 are utilized to create the Delaunay triangle diagram depicted in FIG. 10 and which is contained in the graphic area 994.

User interface 990 can also include one or more user interface elements. User interface 990 includes a design user interface element 995. The design user interface element 995 can include graphic or other indicia with the text "Design," "Save" or "Load." In response to a user interaction (e.g., through a touch interaction or by selecting the user interface element with a computer mouse) with the design user interface element, certain operations can be performed by a computing system. For instance, data related to the design or Delaunay triangle diagram depicted or displayed in the graphic area 994 can be saved to the memory of a computing system such that it can be used or recalled by the user or computing system. Additionally, the user can access data stored in the memory of the computing system or other computer readable media related to a design or Delaunay triangle diagram to be depicted or displayed in the graphic area 994 of user interface 990.

User interface 990 includes a drawing user interface element 996. The drawing user interface element 995 includes graphic or other indicia with the text "Draw," "Line," "Seed," and "Curve." In response to a user interaction (e.g., through a touch interaction or by selecting the user interface element with a computer mouse) with the drawing user interface element 995, certain operations can be performed by a computing system.

User interface 990 also includes a display user interface element 997 located in a portion of the user interface (e.g., a lower right portion of the user interface). The display user interface element 997 can include a graphic or other indicia with the text "Display Control" or "Show." The display user interface element 997 can be associated with displaying one or more items in the graphic area 994. For example, in response to a user interaction with a Delaunay triangle graphic indicia 998 the user can determine whether the Delaunay triangles 991 are or are not displayed in graphic area 994.

Those of ordinary skill will appreciate that the user interface 990 can also be used to cause the computing system to perform operations with regard to the characteristics of the Delaunay triangles 991 in the same manner as can be performed by the computing system with regard to a Voronoi diagram as described in FIGS. 3A, 3B, 4, 5, 6, 7, 8 and 9.

Figure 11:
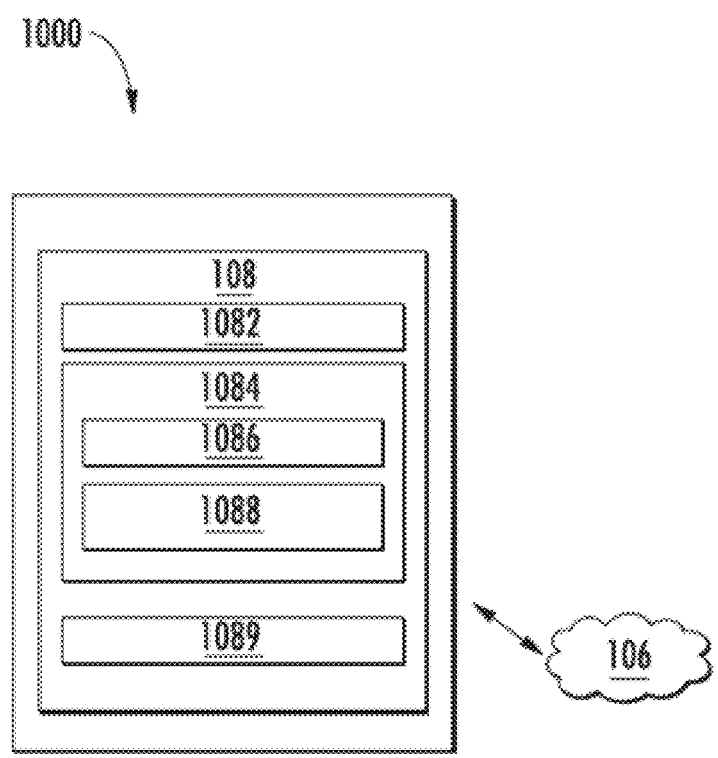
FIG. 11 depicts an example system according to example embodiments of the present disclosure.

FIG. 11 depicts an example system 1000 according to example embodiments of the present disclosure. System 1000 can be implemented using any suitable computing device(s) 108. The computing device(s) 108 can include one or more processors 1082 and one or more memory devices 1084. The one or more processors 1082 can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc.

The one or more memory devices 1084 can include one or more computer-readable media, including, but not limited to, non-transitory computer-readable media, RAM, ROM, hard drives, flash drives, or other memory devices. The one or more memory devices 1084 can store information accessible by the one or more processors 1082, including computer-readable instructions 1086 that can be executed by the one or more processors 1082. The instructions 1086 can be any set of instructions that when executed by the one or more processors 1082, cause the one or more processors 1082 to perform operations. In some embodiments, the instructions 1086 can be executed by the one or more processor(s) 1082 to cause the one or more processor(s) 1082 to perform operations, such as any of the operations and functions for which the computing device(s) 108 are configured, the operations for providing an interactive, user interface, and/or any other operations or functions for providing a user interface, receiving user input, and generating a Voronoi diagram, adjusting the size and location of the design area, adjusting the location of the seeds and/or adjusting other aspects of the Voronoi diagram, as described herein. The instructions 1086 can be software written in any suitable programming language or can be implemented in hardware. Additionally, and/or alternatively, the instructions 1086 can be executed in logically and/or virtually separate threads on processor(s) 1082.

As shown in FIG. 9, the one or more memory devices 1084 can also store data 1088 that can be retrieved, manipulated, created, or stored by the one or more processors 1082. The data 1088 can include, for instance, data associated with user interfaces, user input, motif data, and/or other data or information. For instance, the data 1088 can include motif-related information, at least a portion of which may be transmitted to a user interface, such as a personal computer, computer monitor, tablet or other device. For example, data 1088 can include motifs where each is an organic, natural or other image or design that can be used or inserted into one or more Voronoi cells.

The data 1088 can be stored in one or more databases. The one or more databases can be connected to the computing device(s) 108 by a high bandwidth LAN or WAN, or can also be connected to computing device(s) 108 through network 106. The one or more databases can be split up so that they are located in multiple locales.

The computing device(s) 108 can also include a network interface 1089 used to communicate with one or more other component(s) of the system 1000 over the network 106. The network interface 1089 can include any suitable components for interfacing with one more networks, including for example, transmitters, receivers, ports, controllers, antennas, or other suitable components.

The network 106 can be any type of communications network, such as a local area network (e.g. intranet), wide area network (e.g. Internet), cellular network, or some combination thereof. The network 106 can also include a direct connection between system 1000 and another device. In general, communication by and between system 1000 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein may make reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing textile designs utilizing Voronoi diagrams, the system comprising:
    one or more processors; and
    a non-transitory machine-readable medium storing computer-readable instructions, which when executed by the one or more processors, cause the one or more processors to perform operations comprising:
        generating a plurality of seed points in a graphic area;
        propagating a Voronoi diagram within the graphic area based upon the seed points and, wherein the Voronoi diagram includes a plurality of cells;
        receiving a first user input via a user interface defining a design area with a plurality of boundaries within the graphic area, wherein the design area comprises a sub-set of the plurality of cells;
        adjusting the cells based, at least in part, on a second user input causing relocation of one or more of the seed points in the design area;
        correlating the design area to a textile segment; and
        generating a textile design, using one or more computing devices, by replicating the cells of the design area.

2. The system of claim 1, the operations further comprising replicating the cells of the design area based, at least in part, on an intersection of cells with one or more boundaries of the design area and cells located in a portion of the graphic area adjacent to the one or more boundaries.

3. The system of claim 1, the operations further comprising preventing modification of cells outside of the design area based on one or more third user inputs calling for modifications to be made to cells located outside of the design area.

4. The system of claim 3, the operations further comprising generating one or more motifs in one or more user selected cells located in the design area.

5. The system of claim 4, the operations further comprising locating the one or more motifs based on one or more parameters of the user selected cells, said parameters including cell boundaries, cell vertices and a cell center.

6. The system of claim 5, the operations further comprising providing cells for display to the user.

7. A non-transitory machine-readable medium storing computer-readable instructions, which when executed by a machine, cause the machine to perform operations comprising:
    generating, using one or more computing devices, a plurality of seed points in a graphic area;
    propagating a Voronoi diagram within the graphic area based upon the seed points and, wherein the Voronoi diagram includes a plurality of cells;
    providing the Voronoi diagram for display on a user interface;
    receiving a user input via the user interface, the user input defining a design area with a plurality of boundaries within the graphic area, wherein the design area corresponds to a floor covering tile; and
    generating a floor covering design by replicating the Voronoi cells contained in the design area.

* * * * *